US006913242B2

(12) United States Patent
Reichert et al.

(10) Patent No.: US 6,913,242 B2
(45) Date of Patent: Jul. 5, 2005

(54) SOLENOID PLUNGER SYSTEM WITH AN IMPACT DAMPING MECHANISM

(75) Inventors: Uwe Reichert, Schlüchtem (DE); Hartmut Winter, Birstein (DE)

(73) Assignee: Woco Franz-Josef Wolf & Co. GmbH, Bad Soden-Salmünster (DE)

( * ) Notice: Subject to any disclaimer, the term of this patent is extended or adjusted under 35 U.S.C. 154(b) by 65 days.

(21) Appl. No.: 10/380,980

(22) PCT Filed: Sep. 17, 2001

(86) PCT No.: PCT/EP01/10701

§ 371 (c)(1), (2), (4) Date: Mar. 20, 2003

(87) PCT Pub. No.: WO02/25676

PCT Pub. Date: Mar. 28, 2002

(65) Prior Publication Data

US 2003/0178594 A1 Sep. 25, 2003

(30) Foreign Application Priority Data

Sep. 21, 2000 (DE) ........................................ 100 46 939

(51) Int. Cl.[7] ................................................ F16K 31/02
(52) U.S. Cl. ..................... 251/129.18; 251/64; 335/273
(58) Field of Search .............................. 251/64, 129.15, 251/129.18; 335/257, 258, 273, 277

(56) References Cited

U.S. PATENT DOCUMENTS 2,651,744 A 9/1953 Acklin et al.
2,888,233 A * 5/1959 Windsor .................. 251/30.03
5,326,070 A 7/1994 Baron
5,565,832 A * 10/1996 Haller et al. ................ 335/249
5,878,991 A 3/1999 Krimmer et al.
5,899,436 A * 5/1999 Holmes et al. ........ 251/129.15
6,019,344 A 2/2000 Engel et al.
6,029,703 A * 2/2000 Erickson et al. ....... 137/625.61

FOREIGN PATENT DOCUMENTS

| | | |
|---|---|---|
| DE | 41 10 003 | 7/1992 |
| DE | 44 04 740 | 8/1995 |
| DE | 196 11 886 | 10/1997 |
| DE | 197 54 525 | 4/1999 |
| DE | 199 53 477 | 5/2000 |
| EP | 0 300 407 | 1/1989 |
| JP | 56-116607 | 9/1981 |
| WO | WO 96/12287 | 4/1996 |

* cited by examiner

*Primary Examiner*—Edward K. Look
*Assistant Examiner*—John K. Fristoe, Jr.
(74) *Attorney, Agent, or Firm*—Schiff Hardin LLP

(57) ABSTRACT

The invention is directed to a solenoid plunger system for an electro-pneumatic pressure transducer comprising at least partially in a cladding, particularly an iron cladding, a solenoid plunger, a core such as an iron core or a magnetic core, at least a first recess in the solenoid plunger and/or a second recess in the core and an air gap between the cladding and the solenoid plunger and/or the core that is adjustable by means of a relative motion between the solenoid plunger and the core while the solenoid plunger is at least partially movable into or, respectively, out of the second recess in the core and/or the core is at least partially movable into or, respectively, out of the first recess in the solenoid plunger, as well as a first damping element in the first recess and/or a second damping element in the second recess.

16 Claims, 1 Drawing Sheet

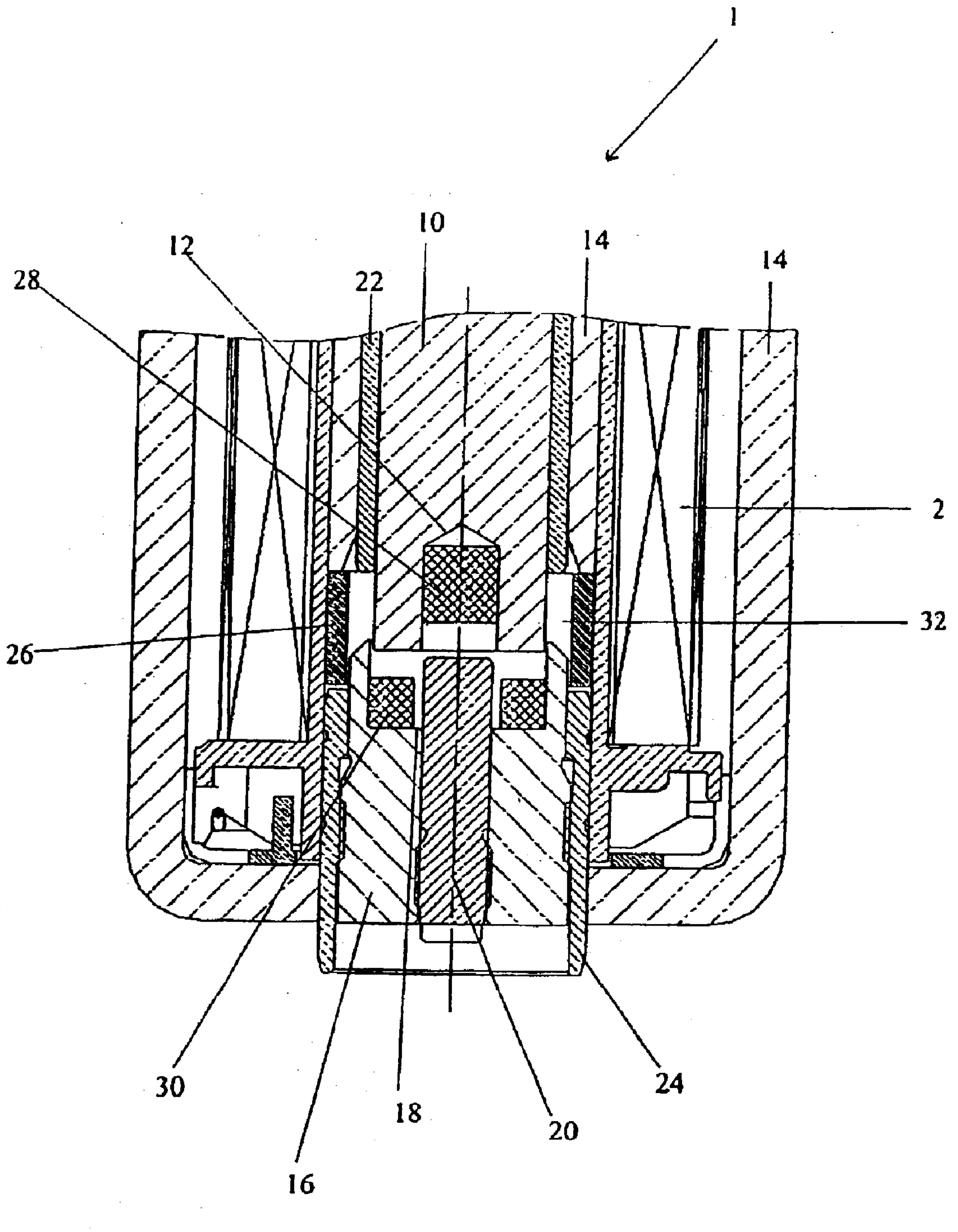
Fig.

SOLENOID PLUNGER SYSTEM WITH AN IMPACT DAMPING MECHANISM

The invention is directed to a solenoid plunger system for an electro-pneumatic pressure transducer comprising at least partially in a cladding, particularly an iron cladding, a solenoid plunger, a core such as an iron core or a magnetic core, at least a first recess in the solenoid plunger and/or a second recess in the core and an air gap between the cladding and the solenoid plunger and/or the core that is adjustable by means of a relative motion between the solenoid plunger and the core while the solenoid plunger is at least partially movable into or, respectively, out of the second recess in the core and/or the core is at least partially movable into or, respectively, out of the first recess in the solenoid plunger.

Such a solenoid plunger system is disclosed, for example, by DE 41 10 003 C1. The known electro-pneumatic transducer, which is particularly employable in a pneumatic control of a motor vehicle, thereby comprises a valve device that is actuated by a diaphragm and the solenoid plunger system and generates a mixed pressure of air at low pressure and atmospheric pressure in a valve chamber by controlling the corresponding connections, said mixed pressure being supplied to a user via a connection. The solenoid plunger system is characterized by the possibility of setting the air gap between the iron cladding and the solenoid plunger, i.e. in the magnetic circuit. The air in the air gap also performs damping functions but only as long as the air gap is more or less sealed, i.e. exhibits no leakage. Leakage has hitherto been avoided in that an oil seal is provided between the solenoid plunger and its bearings, and the solenoid plunger system is cast in resin, at least at its end facing away from the solenoid plunger. Not only are an oil seal and a resin embedding work intensive as well as cost intensive; they are also not adequately dependable for avoiding leakage, so that impact between the solenoid plunger and core and, thus, damage thereto as well as high noise emissions can occur during operation of the electro-pneumatic pressure transducer. Further, air disadvantageously exhibits a great temperature dependency that likewise have a negative influence on the damping properties thereof in the air gap.

It is therefore an object of the present invention to develop the solenoid plunger system of the species such that the disadvantages of the Prior Art are overcome, particularly that, a metallic impact between solenoid plunger and core is reliably avoided for preventing mechanical damage to the solenoid plunger and/or core as well as for reducing a noise emission over a broad range of employment, particularly under oscillatory stressing or, respectively, given a saltus function.

This object is inventively achieved by a first damping element in the first recess and/or a second damping element in the second recess.

It is thereby preferred that the first and/or second damping element is or, respectively, are formed of an elastomer.

Advantageous embodiments of the invention can be characterized in that the core is fashioned bipartite, the second recess is fashioned in the first core part, and the second core part extends through the second recess and can be moved into the first recess or, respectively, out therefrom.

It can thereby be provided that the first core part is essentially annularly concentric around te second core part, and the second damping element is essentially annular.

The invention also proposes that the second core part is essentially cylindrical, and the first damping element is essentially stopper-like.

It can also be inventively provided that the core, particularly the first core part, is movable relative to the solenoid plunger via a threaded sleeve for setting the air gap.

It is also inventively proposed that the second core part is adjustably arranged in the first core part, whereby the second core part can preferably be acted upon at its end facing away from the solenoid plunger for setting the air gap.

It is also inventively proposed that the first and/or second core part comprises or, respectively, comprise a cone section that tapers in the direction of the solenoid plunger.

A plain bearing bush can also be inventively provided for the solenoid plunger.

Finally, a spacer can also be inventively provided between the cladding and the threaded sleeve.

The invention is thus based on the surprising perception that the wear of a solenoid plunger system can be reduced in a cost-beneficial way and that the range of employment thereof can be broadened in that the air gap of the magnetic circuit in an electro-pneumatic pressure transducer serves essentially only the function of setting the electro-pneumatic transducer, whereas damping properties are assumed by at least one additional damping element that is provided between the solenoid plunger and the core, namely in a recess in the core and/or in a recess in the solenoid plunger. The damping element thereby dependably prevents a metallic impact of solenoid plunger and core without requiring the presence of an involved seal; the damping element also damps noise for the reduction of the noise emissions of the electro-pneumatic transducer; and the damping element is preferably fashioned of an elastomer that exhibits a low temperature dependency and thus increases the range of employment of the electro-pneumatic transducer.

Further features and advantages of the invention derive from the following description wherein an exemplary embodiment of the invention is explained in detail on the basis of a schematic drawing. The drawing comprising a single FIGURE thereby shows a partial section of an electro-pneumatic pressure transducer with a solenoid plunger system of the invention.

As can be derived from the FIGURE, an inventive solenoid plunger system 1 comprises a solenoid plunger 10 within a coil 2, said solenoid plunger 10 having a first recess 12 at its end facing away from a diaphragm (not shown) of the electro-pneumatic pressure transducer. The first recess 12 is thereby essentially cylindrical with a conically tapering end. The solenoid plunger 10 proceeds at least partly in an iron cladding 14 that likewise surrounds the coil 2 and at least a part of the iron core. The iron core in turn comprises two components, whereby a first iron core part 16 having a second recess 18 is fashioned, the second iron core part 20 proceeding therein. The solenoid plunger 10 is also guided in a plain bearing bush 22 in the iron cladding 14, whereas the first iron core part 16 is seated in a threaded sleeve 24 that is in turn saved from impacting against the iron cladding 14 by a spacer 26. A damping stopper 28 is arranged in the first recess 12 in the solenoid plunger 10, particularly in the form of an elastomer that partly fills the first recess 12, and a damping ring 30 is arranged in the second recess 18 in the first iron core 16, particularly in the form of an elastomer that partly fills the second recess 18. An air gap 32, finally, is formed between the solenoid plunger 10, the spacer 26 and the iron core 16, 18. The size of the air gap 32 is thereby for adjusting the electro-pneumatic pressure transducer by movement of the first iron core part 16 relative to the solenoid plunger 10, namely by turning at the threaded sleeve 24, and/or movement of the second iron core part 20 relative to the solenoid plunger 10, namely by the turning thereof in the second in the second iron core part 20.

During operation of an electro-pneumatic pressure transducer having the inventive solenoid plunger system 1, the damping ring 28 and the damping stopper 30 prevent a metallic impact of the first iron core 16 or, respectively, of the second iron core 20 against the solenoid plunger, which, first, extends the average service life of the solenoid plunger system 1 due to the reduction of damage and, second, reduces the noise emission, namely advantageously over a broad temperature range due to the low temperature dependency of the elastomer employed for the damping ring 28 as well as for the damping stopper 30.

Both individually as well as in any arbitrary combination, the features of the invention disclosed in the above description, in the claims as well as in the drawing can be critical for realizing the various embodiments of the invention.

What is claimed is:

1. In a solenoid plunger system for an electro-pneumatic pressure transducer, said plunger system comprising elements being at least partially arranged in a cladding, said elements including a solenoid plunger, a core selected from an iron core and a magnetic core, at least one recess selected from a first recess in the solenoid plunger for receiving the core and a second recess in the core for receiving an end of the solenoid plunger, an air gap between the cladding, the solenoid plunger and the core, said air gap being adjustable by relative movement between the solenoid plunger and the core while one of the solenoid plungers is partially movable in and out of the second recess and the core is movable in and out of the first recess, and the core being movable relative to the solenoid plunger for setting the air gap, the improvements comprising a threaded sleeve by which the core is movable relative to the solenoid plunger, a spacer between the cladding and the threaded sleeve, and a damping element being received in said at least one recess.

2. In a solenoid plunger system according to claim 1, wherein the damping element is formed of an elastomer.

3. In a solenoid plunger system according to claim 1, wherein the core is fashioned bipartite having a first core part being provided with the second recess and a second core part extending through the second recess for movement into the first recess, said first core part being movable relative to the solenoid plunger via the threaded sleeve for setting the air gap.

4. In a solenoid plunger system according to claim 3, wherein the second core part is adjustably arranged in the first core part, said second core part having an end facing away from the solenoid plunger and said end being acted on for setting the air gap.

5. In a solenoid plunger system according to claim 3, wherein one of the first and second core parts comprises a cone section that tapers in the direction of the solenoid plunger.

6. In a solenoid plunger system according to claim 1, which includes a plain bearing bush for supporting the solenoid plunger in said cladding.

7. In a solenoid plunger system for an electro-pneumatic pressure transducer comprising elements being at least partially in a cladding, said elements including a solenoid plunger, a core selected from an iron core and a magnetic core, said solenoid plunger having a first recess, said core having a second recess, an air gap between the cladding, the solenoid plunger and the core, said air gap being adjustable by means of relative movement between the solenoid plunger and the core while the solenoid plunger is at least partially movable into and out of the second recess in the core and the core is partially movable into and out of the first recess in the solenoid plunger, so that the core is movable relative to the solenoid plunger for adjusting the air gap, the improvements comprising a threaded sleeve for moving the core relative to the solenoid plunger, a spacer between the cladding and the threaded sleeve, and a first damping element in the first recess and a second damping element in the second recess.

8. In a solenoid plunger system according to claim 7, wherein the first and second damping elements are formed of an elastomer.

9. In a solenoid plunger system according to claim 7, wherein the core is fashioned bipartite, the second recess being in the first core part and the second core part extending through the second recess and being moved into the first recess, the first core part being movable relative to the solenoid plunger by the threaded sleeve for setting the air gap.

10. In a solenoid plunger system according to claim 9, wherein the first core part is essentially annular and concentric around the second core part and the second damping element is essentially annular.

11. In a solenoid plunger system according to claim 9, wherein the second core part is essentially cylindrical and the first damping element is a cylindrical member received in the first recess.

12. In a solenoid plunger system according to claim 9, wherein the second core part is adjustably arranged in the first core part, said second core part having an end facing away from the solenoid plunger, said end being acted on for setting the air gap.

13. In a solenoid plunger system according to claim 9, wherein at least one of the first and second core parts has a cone section that tapers in the direction of the solenoid plunger.

14. In a solenoid plunger system according to claim 7, which includes a plain bearing bush for supporting the solenoid plunger in said cladding.

15. In a solenoid plunger system for an electro-pneumatic pressure transducer, said plunger system comprising elements being at least partially arranged in a cladding, said elements including a solenoid plunger, a core selected from an iron core and a magnetic core, the solenoid plunger having a first recess for receiving the core, the core being fashioned bipartite having a first core part being provided with a second recess for receiving an end of the solenoid plunger and a second core part extending through the second recess for movement into the first recess, an air gap between the cladding, the solenoid plunger and the core, said air gap being adjustable by relative movement between the solenoid plunger and the core while the solenoid plunger is partially movable in and out of the second recess and the core is movable in and out of the first recess, and the core being movable relative to the solenoid plunger for setting the air gap, the improvements comprising a threaded sleeve by which the core is movable relative to the solenoid plunger, a spacer between the cladding and the threaded sleeve, said first core part being movable relative to the solenoid plunger via the threaded sleeve for setting the air gap, the first core part being essentially annular and concentric around the second core part and the damping element being essentially annular and being received in the second recess.

16. In a solenoid plunger system according to claim 15, wherein the second core part is essentially cylindrical and a damping element for the first recess is substantially stopper-like.

* * * * *